United States Patent [19]

Maeda et al.

[11] Patent Number: 5,289,968
[45] Date of Patent: Mar. 1, 1994

[54] ALUMINUM BRAZING METHOD AND FURNACE THEREFOR

[75] Inventors: Toshiaki Maeda, Aichi; Shinji Kurano, Chiryu, both of Japan

[73] Assignee: Nippondenso Co., Ltd., Kariya, Japan

[21] Appl. No.: 961,392

[22] Filed: Oct. 15, 1992

[30] Foreign Application Priority Data

Oct. 18, 1991 [JP] Japan ............................ 3-270875

[51] Int. Cl.$^5$ ................................................ B23K 1/20
[52] U.S. Cl. .................................. 228/223; 228/262.5; 228/233.2
[58] Field of Search ............... 228/223, 219, 220, 217, 228/242, 262.5, 263.17, 240, 239, 233.2

[56] References Cited

U.S. PATENT DOCUMENTS

| | | | |
|---|---|---|---|
| 3,440,712 | 4/1969 | Stroup | 228/263.17 |
| 3,769,675 | 11/1973 | Chartet | 228/240 |
| 3,882,596 | 5/1975 | Kendziora et al. | 228/232 |
| 3,951,328 | 4/1976 | Wallace et al. | 228/207 |
| 4,501,387 | 2/1985 | Hoyer | 228/219 |
| 4,938,410 | 7/1990 | Kondo | 228/242 |
| 5,147,083 | 9/1992 | Halstead et al. | 228/222 |
| 5,156,326 | 10/1992 | Gibson | 228/223 |

FOREIGN PATENT DOCUMENTS

57-42420  9/1982  Japan.
0225880  12/1984  Japan ................... 228/219

*Primary Examiner*—Paula A. Bradley
*Assistant Examiner*—Chuck Y. Mah
*Attorney, Agent, or Firm*—Cushman Darby & Cushman

[57] ABSTRACT

An aluminum brazing method includes the steps of preheating aluminum members in the form of workpieces coated with flux and brazing material in antioxidizing atmosphere gas up to a temperature around the flux activating temperature, and then heating the aluminum members from the temperature around the flux activating temperature to the brazing temperature mainly by forced convection of the anti-oxidizing atmosphere gas. An aluminum brazing furnace includes radiation intercepting members which are provided in the brazing chamber and which intercept the heat radiation to the work-pieces.

6 Claims, 3 Drawing Sheets

F I G. 4
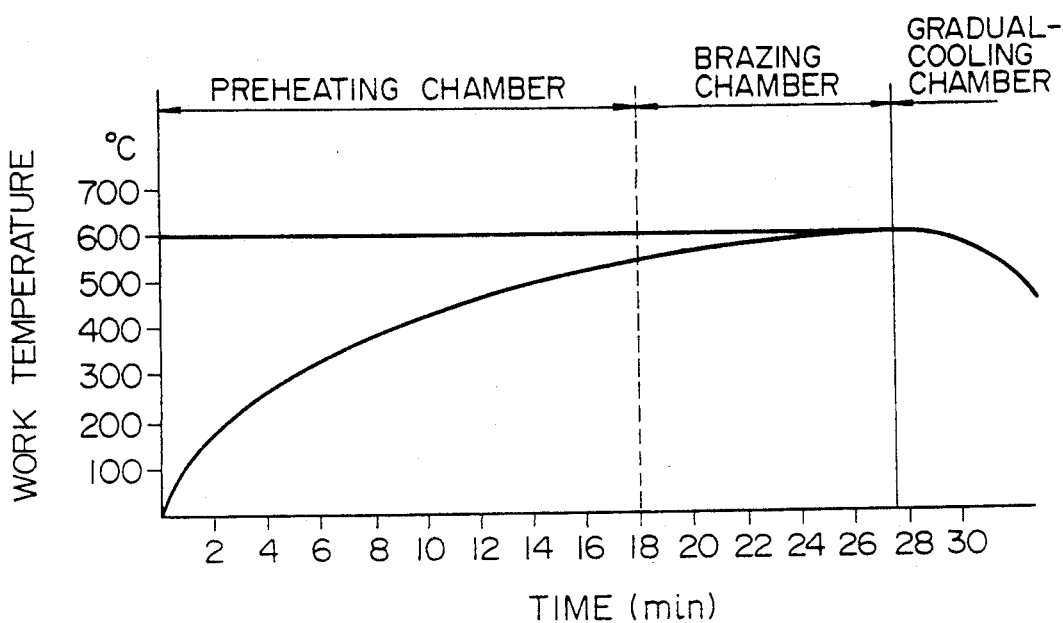
F I G. 5
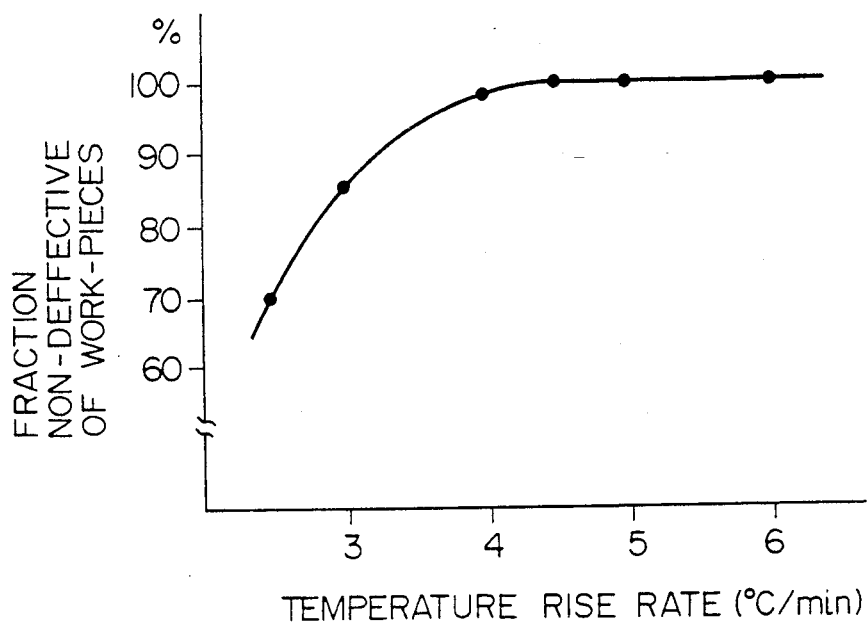

ALUMINUM BRAZING METHOD AND FURNACE THEREFOR

BACKGROUND OF THE INVENTION

This invention relates to an aluminum brazing method and a furnace conducting the method. Herein, the wording of the aluminum brazing means to braze aluminum alloys or aluminum with the same kind of materials or other kind of metals.

An aluminum brazing method has been known according to which aluminum members are brazed in an anti-oxidizing atmosphere by forced-convection heating and radiation heating. Due to the ultilization of forced-convection heating, this conventional brazing method provides relatively high heating efficiency and high productivity as compared with methods in which brazing is performed solely by radiation in a muffle furnace or the like. A problem with this conventional method, however, is that the brazing is adversely affected, for example, by the detrimental gas components (e.g., oxygen gas and steam) adsorbed on the aluminum members to be brazed (hereinafter referred to as the "work-pieces") or the detrimental gas components remaining in the gas constituting the anti-oxidizing atmosphere.

To overcome this problem, a method has been disclosed in JP-B2-57-42420 according to which the aluminum members are efficiently preheated by forced convection and radiation in the anti-oxidizing atmosphere and are then brazed mainly by radiation heating. This arrangement helps to reduce, during brazing, the anti-oxidizing atmosphere-gas flow around the sections to be brazed, thereby reducing the amount of detrimental gas components coming into contact with the sections to be brazed.

Apart from this, there has been proposed a method according to which work-pieces coated with flux are brazed in an anti-oxidizing atmosphere primarily by radiation heating and secondarily by convection heating.

Both the brazing method disclosed in the publication mentioned above and the conventional method described above, in which work-pieces coated with flux are brazed in an anti-oxidizing atmosphere primarily by radiation, have the following problem: since the heating of the work-pieces is effected mainly by radiation, temperature variations may occur between work-pieces and work-piece sections depending upon the configuration and arrangement of the work-pieces. When such a temperature variation occurs, the brazing material does not flow to a sufficient degree at those positions where the requisite temperature rise is hard to effect, resulting in deterioration in brazing quality. This problem is particularly serious in a case where the work-piece has a very complicated configuration or in a case where, for the sake of high productivity, the work-pieces are arranged at high density so as to be collectively brazed.

Such a temperature variation might of course be reduced by heating the work-pieces for a longer time at the requisite brazing temperature. Such an increase in heating time, however, would lead to another problem, for example, of erosion of the aluminum members, i.e., the work-pieces, by the brazing material, resulting in a deterioration in productivity. Further, in the case of work-pieces coated with flux, heating the work-pieces for a long time leads to defective brazing due to evaporation of the flux.

The temperature variation due to radiation might also be reduced by arranging the work-pieces at reduced density. That, however, would lead to deterioration in productivity in proportion to the reduction in the arrangement density.

SUMMARY OF THE INVENTION

The present invention has been made in view of the above problems. It is an object of the present invention to provide an aluminum brazing method and an aluminum brazing furnace which are capable of attaining a reduction in the variation of work-piece brazing temperature, an improvement in productivity and a reduction of the influence of the detrimental gas components.

An aluminum brazing method according to this invention comprises: a preheating step in which aluminum members in the form of work-pieces coated, at least in sections to be brazed, with flux and brazing material are preheated in an anti-oxidizing atmosphere; a brazing step in which the preheated work-pieces are heated mainly by forced convection in the above-mentioned protective atmosphere to gradually activate the flux and melt the brazing material; and a gradual-cooling step in which the brazed work-pieces are gradually cooled in the above-mentioned anti-oxidizing atmosphere.

An aluminum brazing furnace according to this invention comprises: a furnace body which can be made airtight and which is equipped with a preheating chamber for preheating aluminum members in the form of work-pieces coated with flux and brazing material, a brazing chamber for gradually activating the flux and gradually melting the brazing material, and a gradual-cooling chamber for gradually cooling the brazed work-pieces; anti-oxidizing atmosphere gas filling means for filling the preheating chamber, the brazing chamber and the gradual cooling chamber with a anti-oxidizing atmosphere gas; conveying means for conveying work-pieces from the preheating chamber to the gradual-cooling chamber by way of the brazing chamber; work-piece feeding means for feeding work-pieces into the preheating chamber; work-piece take-out means for taking work-pieces out of the gradual cooling chamber; heaters which are arranged in the preheating chamber and the brazing chamber and which heat the anti-oxidizing atmosphere gas; circulation fans for generating forced convection of the anti-oxidizing atmosphere gas in the brazing chamber; and radiation intercepting members which are arranged in the brazing chamber and which reduce the amount of heat radiation to the work-pieces so that the heating of the work-pieces may be effected mainly by forced convection.

The sections of the aluminum member where brazing is to be performed are first coated with a brazing material layer and then with a flux layer. The brazing material layer is usually formed to a thickness of 5 to 10% of the thickness of the aluminum members, and the flux layer is usually formed by applying a flux solution prepared by dissolving the flux in water in a concentration of 3 to 10 wt %.

Herein, the aluminum members may be made of pure aluminum or an aluminum alloy containing an alloying element of aluminum as the main component.

The flux may be potassium aluminum fluoride anyone selected from $KAlF_4$, $K_3AlF_6$ and $K_2AlF_5 \cdot H_2O$, or an admixture thereof.

Examples of the brazing materials which can be adopted include JIS BA4343, BA4045 and BA4047.

BRIEF DESCRIPTION OF THE DRAWINGS

FIG. 4 is a graph showing changes in work-piece temperature in this embodiment; and FIG. 5 is a graph showing the relationship between temperature rise rate and fraction non-defective.

DETAILED DESCRIPTION OF THE INVENTION

Figure 1:
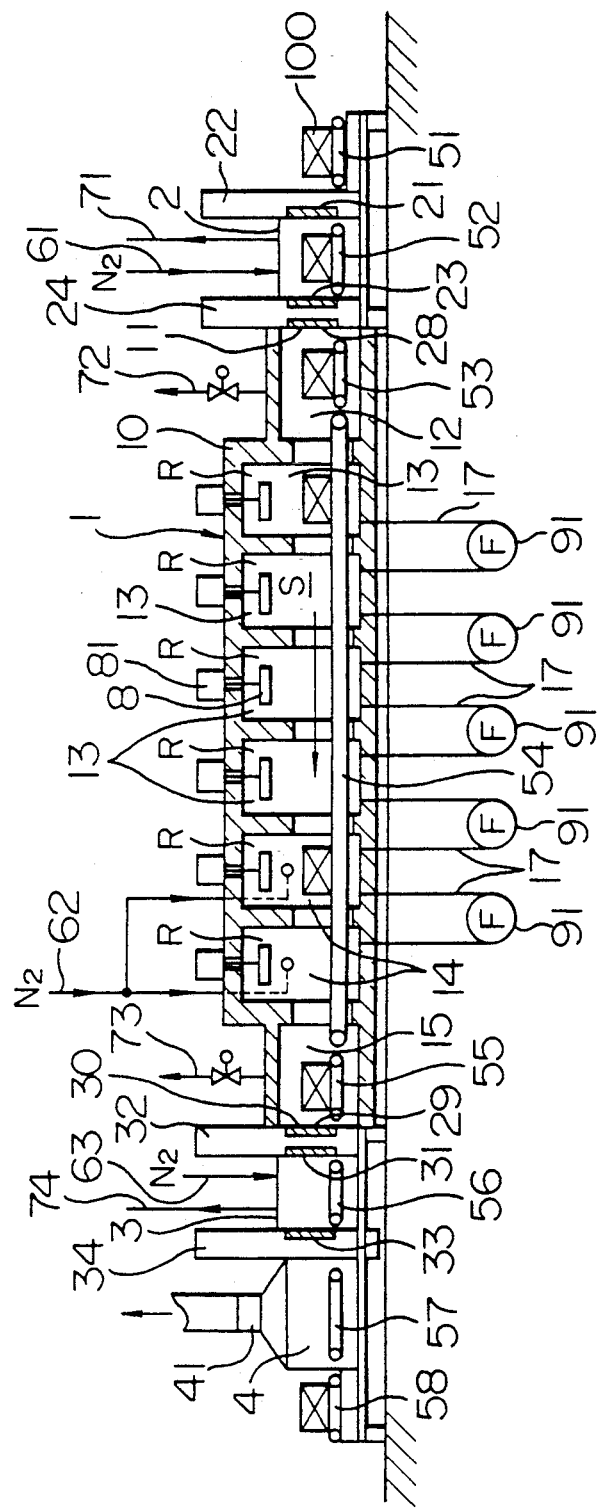
FIG. 1 is a schematic sectional view of an aluminum brazing furnace according to an embodiment of the present invention.

In a preferred form of the brazing method of this invention, the work temperature is raised from the flux activating temperature (for example, 550° C.) to the brazing temperature (for example, 600° C.) at a rate of 5° C. to 25° C. per minute, more preferably, at a rate of 10° C. to 20° C. per minute. When the temperature rise rate is maintained in the above range, the concentration of an ordinary flux solution (which is approximately 3 to 5%) need not be changed, and no flux shortage due to flux evaporation occurs during the temperature rise period. If the temperature rise rate is below this range, the amount of flux evaporated during the temperature rise period increases, so that, when the thickness of the brazing material layer is small, the brazing quality may deteriorate and, when the thickness of the brazing material layer is large, the brazing material flows to cause a reduction in the melting point, resulting in the work-pieces being eroded.

The temperature rise rate in the brazing process is substantially determined by three factors: forced-convection gas flow speed, forced-convection gas temperature, and work-piece condition. The forced-convection gas flow speed is preferably set at 0.5 to 4 m/sec, more preferably, at 0.6 to 3 m/sec (as measured in the central portion of the work-piece), and the forced-convection gas temperature (as measured prior to the feeding of the work-pieces into the brazing chamber) is preferably set at approximately 550° C. to 600° C.

In a preferred form of the brazing method of the present invention, the oxygen concentration in the brazing process is set at 100 ppm or less, more preferably at 50 ppm or less, and the dew point is set at −35° C. or less, more preferably at −40° C. or less. When the oxygen concentration and the dew point are maintained in the above ranges, no defects in brazing are involved provided that the flux layer has a normal thickness.

In a preferred from of the brazing surface of the present invention, there is provided an anti-oxidizing atmosphere gas injection means for injecting antioxidizing atmosphere gas into the brazing chamber and a anti-oxidizing atmosphere gas discharging means for discharging the anti-oxidizing atmosphere gas from the gradual cooling chamber and from the inlet section of the preheating chamber. Here, it is more desirable to divide the preheating chamber into a plurality of small chambers which allow conveyance of work-pieces therethrough and which are gas-permeable and to provide a diverting fan for diverting the anti-oxidizing atmosphere gas from each small chamber on the downstream side to the adjacent small chamber on the upstream side.

When, in a preferable form of the brazing furnace of the present invention, potassium aluminum fluoride is employed as the flux, it is desirable to preheater the work-pieces in the preheating chamber up to 550° C. (the flux activating temperature). When the preheating temperature is higher than this, a problem of flux evaporation occurs, and, when the preheating temperature is lower than this, the temperature rise in the brazing chamber, which is effected by convection only, takes a long time, so that, also in this case, the increase in the amount of flux evaporated in the brazing chamber cannot be neglected.

In a preferred form of the brazing furnace of the present invention, a baffle in the form of a metal hood is formed in such a way as to surround the work-piece feeding area in the brazing furnace to form a forced-convection flow passage. Further, panel-shape radiation intercepting members made of a heat insulating material are attached to the inner or outer surfaces of this baffle.

In the brazing furnace of the present invention, aluminum members in the form of work-pieces coated with flux and brazing material are conveyed by the conveying means, preheated in the preheating chamber, brazed in the brazing chamber, and gradually cooled in the gradual-cooling chamber. The anti-oxidizing-atmosphere gas, the work-piece feeding means feeds the work-pieces into the preheating chamber, and the work-piece take-out means takes the work-pieces out of the gradual-cooling chamber. The heaters heat the anti-oxidizing-atmosphere gas in the preheating chamber and the brazing chamber, and the circulation fans generate a forced convection of the anti-oxidizing-atmosphere gas inside the brazing chamber to heat the preheated work-pieces, thereby melting and activating the flux and then melting the brazing material to effect brazing. The activated flux protects the brazed surface of the work-pieces from the detrimental gas components. The radiation intercepting members provided in the brazing chamber intercept the heat radiation to the work-pieces, thereby preventing temperature variation between work-pieces and work-piece sections due to any variation in the radiation.

DESCRIPTION OF THE PREFERRED EMBODIMENT

As an embodiment of the aluminum brazing furnace of the present invention, is brazing furnace for vehicle heat exchangers will be described with reference to the drawings.

A furnace body 1 includes an elongated inner space S which is surrounded by a heat insulating airtight wall 10 having a thickness of approximately 30 cm and which communicates with an inlet 11 and an outlet 30. Provided adjacent to the inlet of the furnace body 1 is an inlet-side vestibule 2, and provided adjacent to the outlet of the furnace body 1 is an outlet-side vestibule 3 and, further, provided adjacent to the outlet of the outlet-side vestibule 3 is a cooling chamber 4. The heat insulating airtight wall 10 is composed of a heat insulating wall made of a ceramic material and a metal-plate wall covering this heat insulating wall.

To perform the feeding, conveyance and taking-out of work-pieces through the above components 1 through 4, a row of conveyers 51 to 58 are provided, and to fill these components 1 through 4 with nitrogen gas (the atmosphere gas), filling piping systems (anti-oxidizing-atmosphere gas filling means) 61 through 63 are provided. To discharge the gas out of these components 1 through 4, discharge piping systems (anti-oxidizing atmosphere gas discharge means) 71 through 73 are provided.

Provided inside the furnace body 1 are heaters 7 and circulation fans 8, and provided outside the furnace body 1 are diverting fans 91. Further, provided in the section on the downstream side of the furnace body 1 with respect to the direction of conveyance are radiation intercepting members 9 (see FIG. 3), which constitute the principal feature of this furnace.

This brazing furnace will now be described in more detail.

The furnace body 1 substantially has a width of 2.4 m, a height of 2.6 m, and a length of 15 m. The inner space of the furnace body 1 includes a feeding chamber 12, a preheating chamber 13, a brazing chamber 14, and a gradual cooling chamber 15 also serving as a take-out chamber, arranged in order from the inlet 11 to the outlet 12. The preheating chamber 13 is divided into four small chambers R arranged along the direction of conveyance, and the brazing chamber 14 is also divided into two small chambers R arranged likewise along the direction of conveyance.

These small chambers R are separated from each other by partitions each having a minimum opening (90 cm high and 100 cm wide) which is large enough to allow conveyance of work-pieces. Partitions having a similar construction are also arranged between the feeding chamber 12 and the preheating chamber 13 and between the brazing chamber 14 and the gradual cooling chamber 15, thereby restraining the generation of a needless gas flow.

The inlet-side vestibule 2 is an anteroom for gas exchange which can be made airtight. Provided at the inlet of this vestibule is a door hood 22 having a door 21 which can be raised and lowered. Provided at the outlet of this vestibule is a door hood 24 having a door 23 which can be raised and lowered. By closing these doors 21 and 23, the inner vestibule chamber can be made airtight.

The outlet-side vestibule 3 is also an anteroom for gas exchange which can be made airtight. Provided at the inlet of this vestibule is a door hood 33 having a door 31 which can be raised and lowered. Provided at the outlet of this vestibule is a door hood 34 having a door 33 which can be raised and lowered. The door hood 32 is provided between the outlet-side vestibule 3 and the outlet 12 of the furnace body 1, and a door 29, which can be raised and lowered, allows the outlet 12 of the furnace body 1 to be opened and closed. By closing the doors 28 and 29, the inner space of the furnace body 1 can be made airtight. The door hoods 24 and 32 are closed rectangular metal boxes including doors and door-raising/lowering devices.

The cooling chamber 4 is arranged in contact with the outlet-side vestibule 3 and has in its ceiling section a high-power exhaust fan 41 for cooling work-pieces.

A conveyer 51 is a feeding conveyer for feeding work-pieces into the vestibule 2, and a conveyer 52, which is provided inside the inlet-side vestibule 2, is a conveyer for in-vestibule conveyance. A conveyer 53 arranged inside the feeding chamber 12 is a vestibule take-out conveyer, and a conveyer 54 arranged inside the preheating chamber 13 and the brazing chamber 14 is a conveyer for conveying work-pieces. A conveyer 55 provided inside the gradual-cooling chamber 15 is a vestibule feeding conveyer, a conveyer 56 provided inside the outlet-side vestibule 3 is a conveyer for in-vestibule conveyance, and a conveyer 58 is a take-out conveyer for taking work-pieces out of the outlet-side vestibule 3.

A filling piping system 61 is a piping for filling the inlet-side vestibule 2 with nitrogen gas, a filling piping system 62 is a piping for filling the two small chambers R of the brazing chamber 14 with nitrogen gas, and a filling piping system 63 is a piping for filling the outlet-side vestibule 3 with nitrogen gas.

A discharge piping system 71 is a piping for discharging the gas inside the inlet-side vestibule 2, a discharge piping system 72 is a piping for discharging gas from the feeding chamber 12, a discharge piping system 73 is a piping for discharging gas from the gradual-cooling chamber 15, and a discharge piping system 74 is a piping for discharging gas from the outlet-side vestibule 3.

Figure 2:
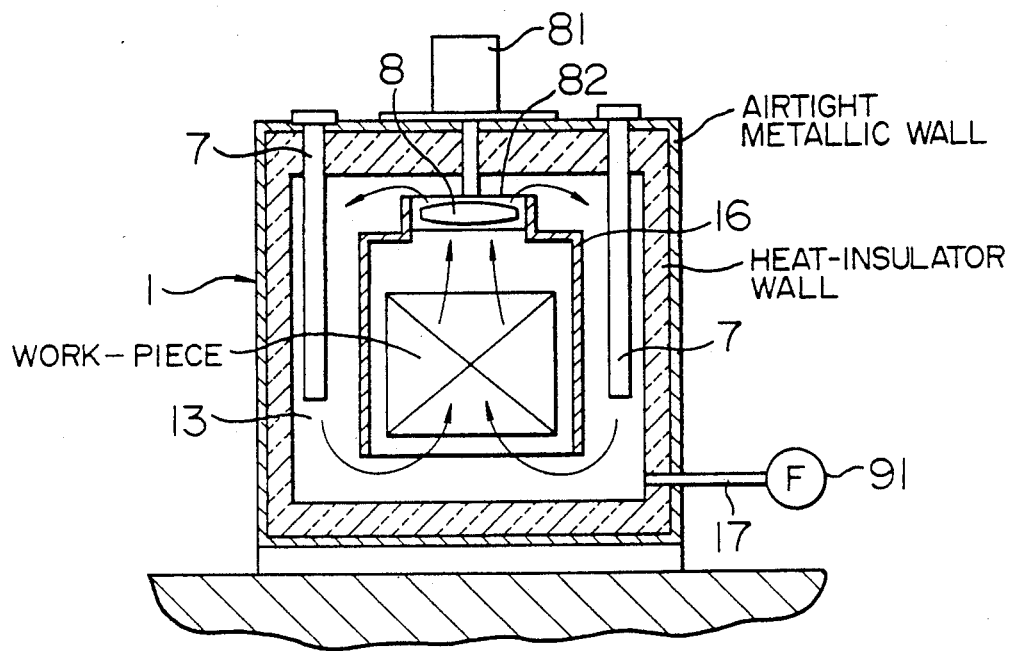
FIG. 2 is a schematic sectional view of a preheating chamber in this embodiment.
Figure 3:
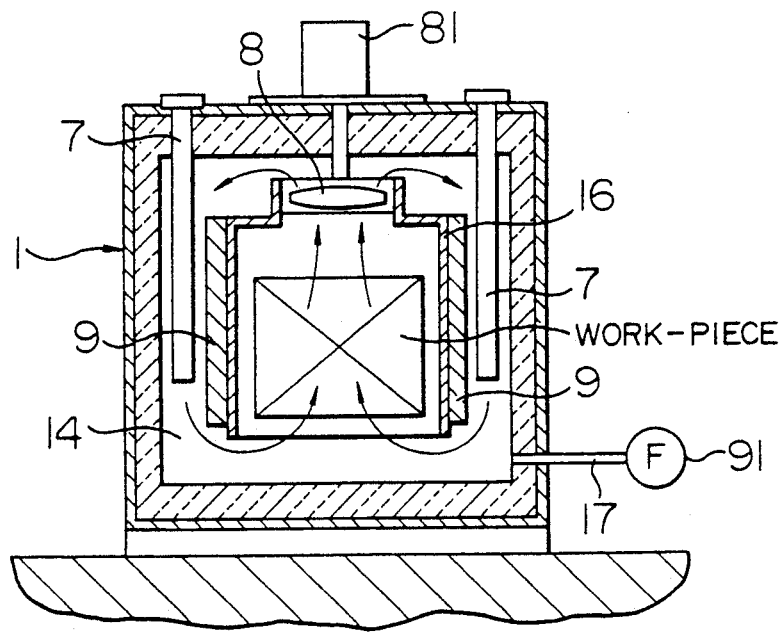
FIG. 3 is a schematic sectional view of a brazing chamber in this embodiment.

The preheating chamber 13 and the brazing chamber 14 will now be described. FIG. 2 is a sectional view of the preheating chamber 13 taken perpendicularly to the direction of conveyance, and FIG. 3 is a sectional view of the brazing chamber 14 taken perpendicularly to the direction of conveyance.

The heaters 7 are pipe heating containing resistor lines having a heat generating capacity of 6 KW. Six heaters 1 are provided in each small chamber R of the preheating chamber 13. The heaters 7 extend vertically downwards from the ceiling, in close proximity of the inner side-wall surfaces.

Provided on the outer surface of the top section of the furnace body 1 is a speed-reduction motor 81, the driving shaft of which is joined to a rotating shaft, which rotatably extends downwards through the top section. A circulation fan 8 is attached to the lower end of the rotating shaft, at a position close to the top section. The circulation fan 8 has a rotating speed of 900 rpm and a diameter of approximately 80 cm and is of an eight-blade type. One circulation fan 8 is arranged in each small chamber R of the preheating chamber 13 and the brazing chamber 14.

The sections immediately below the circulation fans 8, that is the central sections of the preheating chamber 13 and the brazing chamber 14 constitute a work-piece conveyance area. A baffle 16, which is open only on the lower side, is arranged in such a way as to surround this work-piece conveyance area. The baffle 16 is horizontally spaced apart from the heaters 7 on both sides thereof by approximately 20 cm, and is vertically spaced apart from the bottom surface of the furnace body 1 by approximately 40 cm. The baffle 16, which is a metal hood member, defines a forced-convection passage inside the small chamber R and, at the same time, receives the heat from the heaters 7 to attain high temperature, thereby heating work-pieces by radiation. Provided at the upper and of the baffle 16 is a shroud 82 surrounding the circulation fan 8. Due to the provision of this shroud, the forced convection generated by the circulation fan 8 circulates as indicated by the arrows in FIGS. 2 and 3.

Further, diverting fans 91 are arranged adjacent to one side of the furnace body 1 (FIG. 1 shows only the diverting fans 91 on one side). Each diverting fan 91 supplies anti-oxidizing-atmosphere gas from a small chamber R on the downstream side to the adjacent small chamber R on the upstream side through the gas piping 17. As shown in FIGS. 2 and 3, the gas piping 17 extends through the lower section of a side wall of the furnace body 1.

Since the nitrogen gas is supplied to the two small chambers R of the brazing chamber 14 and discharged from the feeding chamber 12 and the slow-cooling chamber 15, there are generated in the furnace body 1 a gas flow from the brazing chamber 14 to the feeding chamber 12 through the preheating chamber 13 and a gas flow from the brazing chamber 14 to the gradual-cooling chamber 15. Detrimental gas components (oxygen gas, steam, oil mist, etc.) are allowed to enter the brazing-chamber 14 together with the work-pieces mainly by adsorption on the work-pieces. The intruding detrimental gas components, however, are discharged by the above-mentioned gas flows.

It should be noted that the path from the brazing chamber 14 to the feeding chamber 12 is longer than the path from the brazing chamber 14 to the gradual-cooling chamber 15 and has a larger flow resistance, so that the gas flow from the brazing chamber 14 to the feeding chamber 12 is promoted by the diverting fans 91. That is, due to these diverting fans 91, the detrimental gas components accompanying the work-pieces are caused to gradually flow back in the preheating chamber 13 before they reach the brazing chamber 14, with the result that the amount of detrimental gas components reaching the brazing chamber 14 can be reduced.

As is apparent from comparison of FIG. 2 with FIG. 3, the construction of the small chambers R of the brazing chamber 14 is substantially the same as that of the small chamber R of the preheating chamber 13. The former construction differs from the latter only in that panel-shape radiation intercepting members 9 made of a heat insulating material are provided on the outer side surfaces of the baffle 16.

Specifically, these radiation intercepting members 9 are made of a ceramic material. They have a thickness of 10 cm and extend to cover the length of the brazing chamber 14 in the direction of conveyance. The outer surfaces of the radiation intercepting members 9 are spaced apart from the heaters 7 by 10 cm.

In the following, the basic operation of the furnace of this embodiment will be described together with the effects constituting the features of the brazing method of this embodiment.

First, the work-pieces used are heat exchangers consisting of aluminum tubes coated with a brazing material layer on which a flux layer is formed. The thickness of the brazing material layer is 5 to 10% of the aluminum member, and the flux layer is formed by applying a flux solution having a concentration of 3 to 10%. Potassium aluminum fluoride is adopted as the flux and an Al-Si-alloy system as the brazing material.

Each work-piece has a width of approximately 20 cm, a length of approximately 30 cm, and a height of approximately 5 cm. The work-pieces are arranged, without being stacked, at intervals of approximately 8 cm inside a wire-gause basket 100 for conveyance, which is placed on the conveyer 51.

Then, the door 21 of the inlet-side vestibule 2 is opened, and the conveyers 51 and 52 are operated in synchronization to feed the work-pieces into the vestibule 2. The door 21 is then closed.

Next, the air in the inlet-side vestibule 2 is discharged by a vacuum pump (not shown) to attain a pressure of 0.1 Torr, and then the vestibule is filled with nitrogen gas, which is an inert gas, until the atmospheric pressure is attained.

Subsequently, the doors 23 and 28 are opened, and the conveyers 52 and 53 are operated in synchronization at high speed to feed the work-pieces from the inlet-side vestibule 2 to the feeding chamber 12 inside the furnace body 1.

The work-pieces fed into the feeding chamber 12 are continuously conveyed, by operating the conveyers 53 and 54 in synchronization at low speed, from the feeding chamber 12 to the gradual-cooling chamber 15 by way of the preheating chamber 13 and the brazing chamber 14. In the meantime, the work-pieces are preheated in the preheating chamber 13 up to approximately 550° C. by forced convection and radiation mainly from the baffles 16, which have been heated up to approximately 400° to 560° C. by radiation from the heaters 7.

Due to the provision of the radiation intercepting members 9 on the baffles 16, the radiation from the heaters 7 to the baffles 16 is suppressed in the brazing chamber 14, so that the temperature of the baffles 16 is kept relatively low (substantially at the gas temperature). Accordingly, the amount of heat radiation from the baffles 16 to the work-pieces is substantially reduced. As a result, the work-pieces are heated practically by forced convection, so that the temperature variation between the brazed sections of work-pieces and between work-pieces is reduced, thereby reducing defective brazing due to such temperature variations. The work-pieces entering the brazing chamber 14 are heated substantially by forced convection only. By this heating, the flux is activated and then the brazing material is melted to effect brazing.

FIG. 4 shows the relationship between the work-piece temperature in the furnace body 1 and time.

In the brazing chamber 14, the temperature of the work-pieces is raised from the flux activating temperature (e.g., 550° C.) to the brazing temperature (e.g., 600° C.) at a rate of 5° C. per minute. This arrangement makes it possible to maintain the flux evaporation amount within a permissible range so that no defective brazing is involved. The temperature rise rate is substantially determined by the three factors of forced-convection gas flow speed, forced-convection gas temperature, and work-piece condition. Making the forced-convection gas temperature extremely high results in a large variation in work-piece temperature. Here, the temperature of the nitrogen gas supplied to the work-pieces is set at approximately 600° C., and the forced convection flow speed at 0.6 m/sec (as measured in the central portion of the work-piece). Due to this arrangement, it is possible to raise the temperature of the work-pieces from the flux activating temperature to the brazing temperature at a rate of 5° C. per minute on the average. In this example, the oxygen concentration in the brazing chamber 14 was set at 50 ppm or less and the dew point at −40° C. or less.

Next, the brazing work-pieces are conveyed to the gradual cooling chamber 15 by synchronized low-speed operation of the conveyers 54 and 55 to be gradually cooled to a temperature of 540° C. or less. Then, the doors 29 and 31 are opened and the work-pieces are conveyed to the outlet-side vestibule 3 by operating the conveyers 55 and 56 in synchronization at high speed.

Subsequently, the doors 29 and 31 are closed, and the door 33 is opened. By synchronized operation of the conveyers 56 and 57, the work-pieces are conveyed to the cooling chambers 4, where they are rapidly cooled to a temperature at which handling is easy. Then, the work-pieces are taken out of the furnace by operating the conveyers 57 and 58 in synchronization.

FIG. 5 shows the relationship between the rate at which the temperature of the work-pieces is raised from the flux activating temperature (e.g., 550° C.) to the brazing temperature (e.g., 600° C.) and the fraction non-defective in brazing. In the drawing, the conditions are the same as those of the above-described embodiment except for the temperature rise rate. The fraction non-defective in brazing was obtained through examination for leakage at the brazing sections of the work-pieces.

In the case where the heating is mainly effected by forced convection, a temperature rise rate of 26° C. per minute or more is hard to realize from various viewpoints. Thus, a preferable temperature rise rate ranges from 5° C. to 25° C. per minute.

Although it has the same construction as the conventional furnaces, in which the heating for brazing is effected by both forced convection and radiation, the furnace of the above-described embodiment makes is possible to accommodate work-pieces in the wire-gauge, basket 100 in three times the density as compared with the conventional furnaces, thus helping to attain a substantial improvement in productivity.

While the above embodiment has been described with respect to a continuous brazing furnace, brazing method of the present invention is naturally applicable to other types of brazing furnaces. For example, it is applicable to a small-scale brazing furnace allowing batch operation and having a preheating chamber which also serves as a brazing chamber, and an inlet vestibule which disc serves as an outlet vestibule. In that case, to rapidly heat the work-pieces during preheating by radiation and forced convection and to raise their temperature from the flux activating temperature to the brazing temperature mainly by forced convection, a movable radiation intercepting member is provided between the baffle and the heaters or between the baffle and the work-pieces; during preheating, the radiation intercepting member is spaced apart from the above position; and, after preheating, the member is restored to the position. Apart from this, it is also possible to provide heat insulating panels on both sides of the work-pieces, arranging radiation-only heaters on the baffle side and forced-convection-only heaters on the side of the furnace-body side walls. In that case, both types of heaters are used during preheating to affect rapid heating by radiation and forced convection. During brazing, heating it effected by forced convection only while restraining temperature variation.

Referring to FIG. 3, it is not necessary for the radiation intercepting members 9 to be in constant with the baffle 16; they may be arranged in any other fashion as long as they can reduce the radiation from the heaters 7 directly to the work-pieces or through the baffle 16.

As described above, in accordance with the aluminum brazing method of the Present invention, aluminum members coated with flux and brazing material are heated in a anti-oxidizing atmosphere gas mainly by forced convection.

Due to this arrangement, the work-pieces are uniformly heated by forced convection, and contact of the detrimental gas components with the brazed surface due to this forced convection is prevented by the flux, so that defective brazing due to any variation in work-piece brazing temperature can be reduced. Further, an improvement in productivity can be attained by high-density arrangement of the work-pieces at the time of brazing, and defective brazing can be reduced by avoiding contact of the detrimental gas components with the brazed sections. As a result, an aluminum brazing method can be provided which has a markedly higher productivity and yield as compared with the conventional brazing methods.

In the aluminum brazing furnace of the present invention, there is provided in the brazing chamber, in which a forced convection of the anti-oxidizing atmosphere gas is generated, radiation intercepting members which intercept the radiation from the heaters to the work-pieces, so that direct radiation to the work-pieces can be intercepted by a simple structure to reduce the amount of heat radiation received by the work-pieces, thus making it possible to execute the above aluminum brazing method.

We claim:

1. An aluminum brazing method comprising:
   a preheating step in which aluminum or aluminum alloy members in the form of work-pieces coated, at least in sections to be brazed, with flux of potassium aluminum fluoride and brazing material of Al-Si-alloy system are preheated in an anti-oxidizing atmosphere up to a starting temperature of activating said flux;
   a brazing step in which the preheated work-pieces are further heated within a surrounding means inhibiting radiation heat to the work-pieces mainly by forced convection in said anti-oxidizing atmosphere from said starting temperature up to a determined temperature at a rate of 5° C. to 25° C. per minute to gradually activate the flux and melt the brazing material; and
   a gradual cooling step in which the brazed work-pieces are gradually cooled in said anti-oxidizing atmosphere.

2. An aluminum brazing method according to claim 1, wherein the work-pieces are heated in said brazing step from 550° to 600° C. at a rate of 5° C. to 25° C. per minute.

3. An aluminum brazing method according to claim 2, wherein said anti-oxidizing atmosphere in the brazing step contains less than 100 ppm of oxygen, with a dew point of less than −35° C.

4. An aluminum brazing method according to claim 1, wherein the potassium aluminum fluoride is anyone selected from a group consisting of $KAlF_4$, $K_3AlF_6$ and $K_2AlF_5 \cdot H_2O$, or an admixture thereof.

5. An aluminum brazing method according to claim 1, wherein the heating by forced convection in said brazing step is effected in an anti-oxidizing atmosphere gas such that flow velocity is 0.5 to 4 m/sec at the central portion of the work-piece.

6. An aluminum brazing method according to claim 5, wherein the flow velocity of said forced convection of the anti-oxidizing atmosphere gas is preferably 0.6 to 3 m/sec.

* * * * *